M. L. LYNCH.

Engineers' Level Rod.

No. 9,639. Reissued April 5, 1881.

WITNESSES:

W. W. Hollingsworth

John C. Kennon

INVENTOR:

M. L. Lynch

BY

ATTORNEYS.

N. PETERS, PHOTO-LITHOGRAPHER, WASHINGTON, D. C.

UNITED STATES PATENT OFFICE.

MICHAEL L. LYNCH, OF CAMERON, TEXAS.

ENGINEER'S LEVEL-ROD.

SPECIFICATION forming part of Reissued Letters Patent No. 9,639, dated April 5, 1881.

Original No. 234,997, dated November 30, 1880. Application for reissue filed March 10, 1881.

*To all whom it may concern:*

Be it known that I, MICHAEL L. LYNCH, of Cameron, in the county of Milam and State of Texas, have invented a new and Improved Engineer's Level-Rod; and I do hereby declare that the following is a full, clear, and exact description of the same, reference being had to the accompanying drawings, forming part of this specification.

My invention relates to the class known as "self-reading level-rods," and is distinguished from others by the peculiar manner of marking the scale upon the face of the rod, whereby the readings of fractions of a foot may be readily made without the use of a sliding target.

Heretofore such rods have been made showing the foot-marks and intermediate one-tenths of a foot by straight lines, each tenth-mark in such case being numbered from 1 to 9, inclusive, which required of the engineer to judge or guess at the exact height above or below the nearest tenth-mark on the rod that the cross-wires in his instrument covered. Others, again, have been made with the one-tenths of each foot subdivided by rectangular blocks of alternate black and white colors into spaces of one-hundredth of a foot each, but which in practice, from the confusion to the eye caused by so many small spaces, could not be read accurately beyond a short distance.

My invention consists in the peculiar form of the marks upon the face of the rod by which it is graduated, whereby the rod may be read with great accuracy to the one-hundredth part of a foot without the employment of numerals to indicate the fractional parts, as will hereinafter appear.

Figure 1:
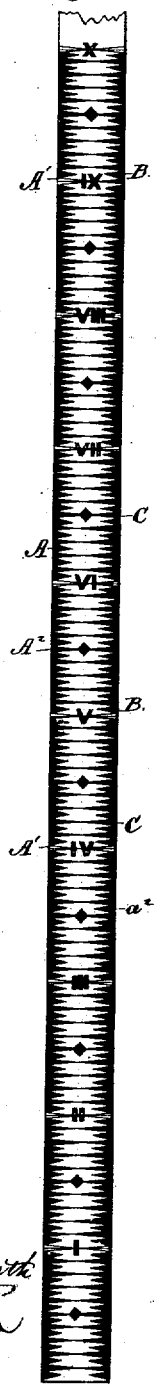
Figure 2:
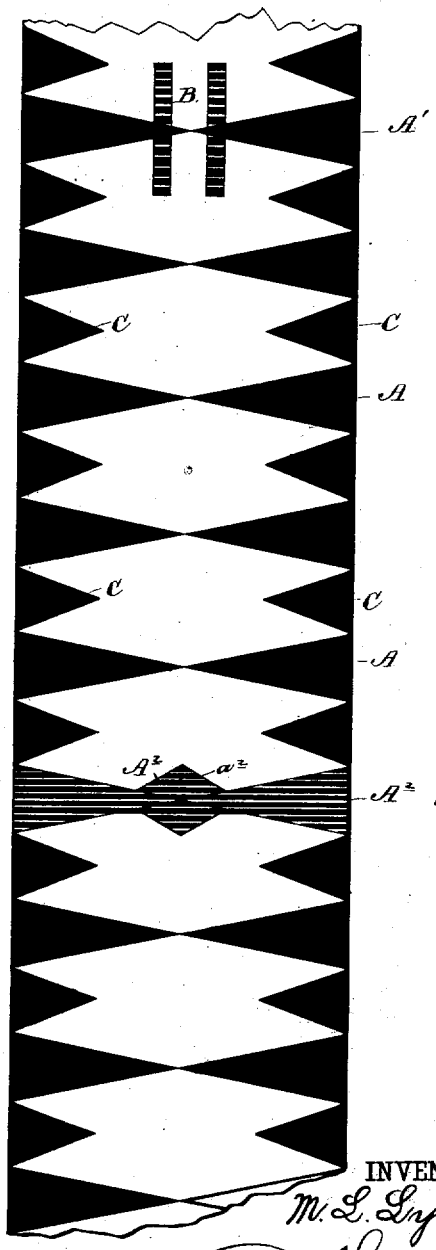

In the accompanying drawings, Figure 1 is a front elevation of a section of rod graduated according to my invention, and Fig. 2 a similar view of a smaller portion of the rod upon a larger scale.

The face of the rod is laid off to feet and tenths of a foot by triangular or half-diamond shaped marks A A′ $A^2$, the bases of which accurately measure the twentieth of a foot, a pair of which are arranged opposite each other along the entire length of the rod, the bases of which rest upon the outer edges of the rod, so that their apexes will touch each other at a point at equal distances from the sides of the rod, and so that ten spaces between the points so arranged will measure, and each apex will consequently indicate, the tenth of a foot from the apexes above and below it.

The feet are indicated by the usual numerals, B, arranged across the apexes of each tenth graduation A′ and painted in red color upon a white ground. Each of the graduations, excepting the fifth or half-foot graduation $A^2$ midway between the foot-graduations, is painted in black upon a white ground, while the said intermediate or half-foot graduations $A^2$ are painted in red, with a small diamond-shaped figure, $a^2$, of the same color arranged centrally between and overlapping the adjoining apexes of the said graduations.

In order that the rod may be read to fractions less than the tenth of a foot, the intermediate twentieth-of-a-foot spaces between the graduations A A′ $A^2$ are all covered by smaller triangular figures or graduations C, all of which are painted in black upon the white ground, and the apexes of which are placed at a point but one-fourth of the distance across the face of the rod, so that a line drawn across their apexes will fall midway between the one-tenth graduations, by which means the rod may be read to the twentieth of a foot, and lines drawn across the face of the rod from the points where the ends of the bases of the small and the ends of the bases of the large figures meet will fall at equal distances from the one-twentieth graduation, or as represented by decimals, 0.05, and will therefore enable the rod to be read to the one-fortieth of a foot, or 0.025, while the one-hundredth, or 0.01, of a foot may be judged by the eye.

The above measurements will be readily understood, as the bases of both the large figures A A′ $A^2$ and the small figures C measure the twentieth of a foot, ten of each being required to measure a foot.

It will also be seen that as the points of each of the triangular figures will, if projected across the rod, fall at equal distances from the ends of the bases, the twentieth measurements will be subdivided into fortieths of a foot.

The leading features of my design consist in the manner in which the graduations of each one-tenth of a foot and the subdivisions of the same are laid off on the rod, the peculiar pointed shape of the graduating-figures enabling the operator at the instrument to determine with absolute accuracy each one-tenth of a foot on the rod and each subdivision of two and one-half hundredths between each tenth, and with great accuracy each one-hundredth of a foot of space on the entire rod; also, from the peculiar manner in which the rod is graduated, it does away with the necessity of having the one-tenth marks numbered, as the graduating-mark for each half-foot is of a different shape from the others and painted in a different color, thus materially aiding the eye of the operator at the instrument in enabling him without loss of time to determine the correct elevation.

What I claim as new is—

A leveling-rod provided with triangular figures arranged opposite each other upon the face of the rod, the apex of every alternate figure meeting the apex of its opposite figure at the center of the rod, to define every tenth part of a foot, and the apexes of the intermediate figures extending about one-fourth the distance across the face of the rod from the edges upon which their bases rest, respectively, to define every one-half of each of said tenths or 0.05 of a foot, the whole being so arranged that the salient and re-entrant angles of the said triangular figures shall define, each, one-fortieth or 0.025 of a foot on the entire rod, and each one-half foot or fifth tenth-figure between foot-marks being of a different color from the other figures, and formed with a diamond-shaped central portion, in the manner and for the purpose substantially as described.

MICHAEL L. LYNCH.

Witnesses:
JAMES BOYD,
H. E. BRADFORD.